US009211001B2

(12) United States Patent
Negretti

(10) Patent No.: US 9,211,001 B2
(45) Date of Patent: Dec. 15, 2015

(54) HOLDER FOR AN ELECTRONIC DEVICE

(71) Applicant: Nicolas Felix Negretti, Arlington, VA (US)

(72) Inventor: Nicolas Felix Negretti, Arlington, VA (US)

(*) Notice: Subject to any disclaimer, the term of this patent is extended or adjusted under 35 U.S.C. 154(b) by 107 days.

(21) Appl. No.: 13/668,359

(22) Filed: Nov. 5, 2012

(65) Prior Publication Data

US 2013/0134282 A1    May 30, 2013

Related U.S. Application Data

(60) Provisional application No. 61/629,794, filed on Nov. 28, 2011.

(51) Int. Cl.
| F16M 11/00 | (2006.01) |
| A47B 23/04 | (2006.01) |
| F16M 11/04 | (2006.01) |
| F16M 11/10 | (2006.01) |
| F16M 13/00 | (2006.01) |

(52) U.S. Cl.
CPC ............... *A47B 23/042* (2013.01); *A47B 23/04* (2013.01); *F16M 11/041* (2013.01); *F16M 11/10* (2013.01); *F16M 13/00* (2013.01); *Y10T 29/49826* (2015.01)

(58) Field of Classification Search
CPC .................................................. A47B 23/042
USPC .............. 248/450, 346.5, 346.03; 361/679.41
See application file for complete search history.

(56) References Cited

U.S. PATENT DOCUMENTS

| D101,143 | S | * | 9/1936 | Shank | D6/310 |
| 4,125,243 | A | * | 11/1978 | Liptak | 248/473 |
| D361,561 | S | * | 8/1995 | Baudot | D14/447 |
| 5,911,398 | A | * | 6/1999 | VanLandingham, Jr. | 248/441.1 |
| 6,059,249 | A | * | 5/2000 | Scatterday | 248/450 |
| D453,155 | S | * | 1/2002 | Michel | D14/253 |
| D454,703 | S | * | 3/2002 | Doeing | D6/310 |
| 6,483,698 | B1 | * | 11/2002 | Loh | 361/679.41 |
| D474,736 | S | * | 5/2003 | Sagawa | D13/108 |
| D477,920 | S | * | 8/2003 | McCarty et al. | D6/310 |
| D478,353 | S | * | 8/2003 | Huang | D19/75 |
| D540,327 | S | * | 4/2007 | Wong et al. | D14/434 |
| D628,203 | S | * | 11/2010 | Noble | D14/447 |
| D631,008 | S | * | 1/2011 | Kuroda et al. | D13/108 |
| D637,194 | S |   | 5/2011 | Kuroda et al. |   |
| 7,969,732 | B1 | * | 6/2011 | Noble | 361/679.56 |
| D652,040 | S | * | 1/2012 | Morgan et al. | D14/434 |
| D654,921 | S | * | 2/2012 | Malsan | D14/447 |
| D655,285 | S | * | 3/2012 | Piccolo | D14/253 |

(Continued)

FOREIGN PATENT DOCUMENTS

GB        EP 0172392 A1 *  2/1986
GB           2353699 A  *  3/2001  ............. A47B 21/00

*Primary Examiner* — Jonathan Liu
*Assistant Examiner* — Chiedu Chibogu
(74) *Attorney, Agent, or Firm* — Ziegler IP Law Group

(57) ABSTRACT

A holder allows an electronic device to be positioned on a support surface so that the electronic device is visible to a user. The holder includes a base which is placed on the support surface. At least one front support is connected to and outwardly projecting from the base, and at least one rear support is connected to and outwardly projecting from the base, the rear support being spaced apart from the front support defining a cavity therebetween. The cavity is shaped and dimensioned to receive the electronic device. The electronic device can either be installed in a vertical position or in a horizontal position in the holder.

14 Claims, 20 Drawing Sheets

(56) References Cited

U.S. PATENT DOCUMENTS

| | | | |
|---|---|---|---|
| D659,696 S * | 5/2012 | Lanza | D14/447 |
| D661,309 S * | 6/2012 | Murrer et al. | D14/447 |
| D668,662 S * | 10/2012 | Suiter | D14/447 |
| D671,543 S * | 11/2012 | Sogabe | D14/447 |
| 8,490,846 B1 | 7/2013 | Wheatley et al. | |
| 8,746,638 B2 * | 6/2014 | Carney | 248/188.1 |
| 8,882,062 B2 * | 11/2014 | Piccolo | 248/160 |
| 2006/0165230 A1 * | 7/2006 | Parr | 379/454 |
| 2009/0230161 A1 | 9/2009 | Emsky | |
| 2009/0292851 A1 | 11/2009 | Mead et al. | |
| 2012/0145835 A1 * | 6/2012 | Zaharakis et al. | 248/65 |
| 2012/0314358 A1 * | 12/2012 | Ting | 361/679.09 |
| 2013/0001379 A1 * | 1/2013 | Hobbs | 248/126 |
| 2013/0026329 A1 * | 1/2013 | Lane et al. | 248/459 |
| 2013/0048801 A1 * | 2/2013 | Weinberg | 248/121 |
| 2013/0277529 A1 * | 10/2013 | Bolliger | 248/676 |

* cited by examiner

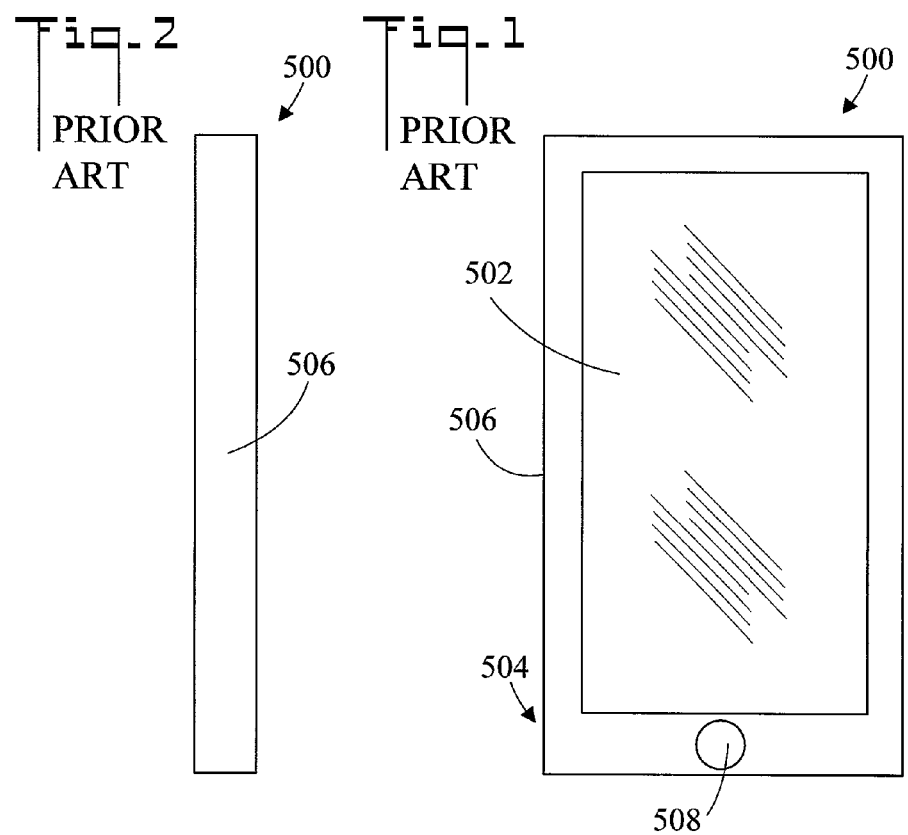
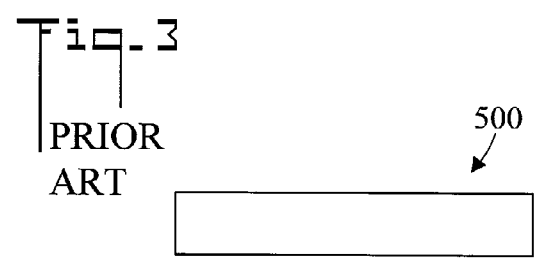

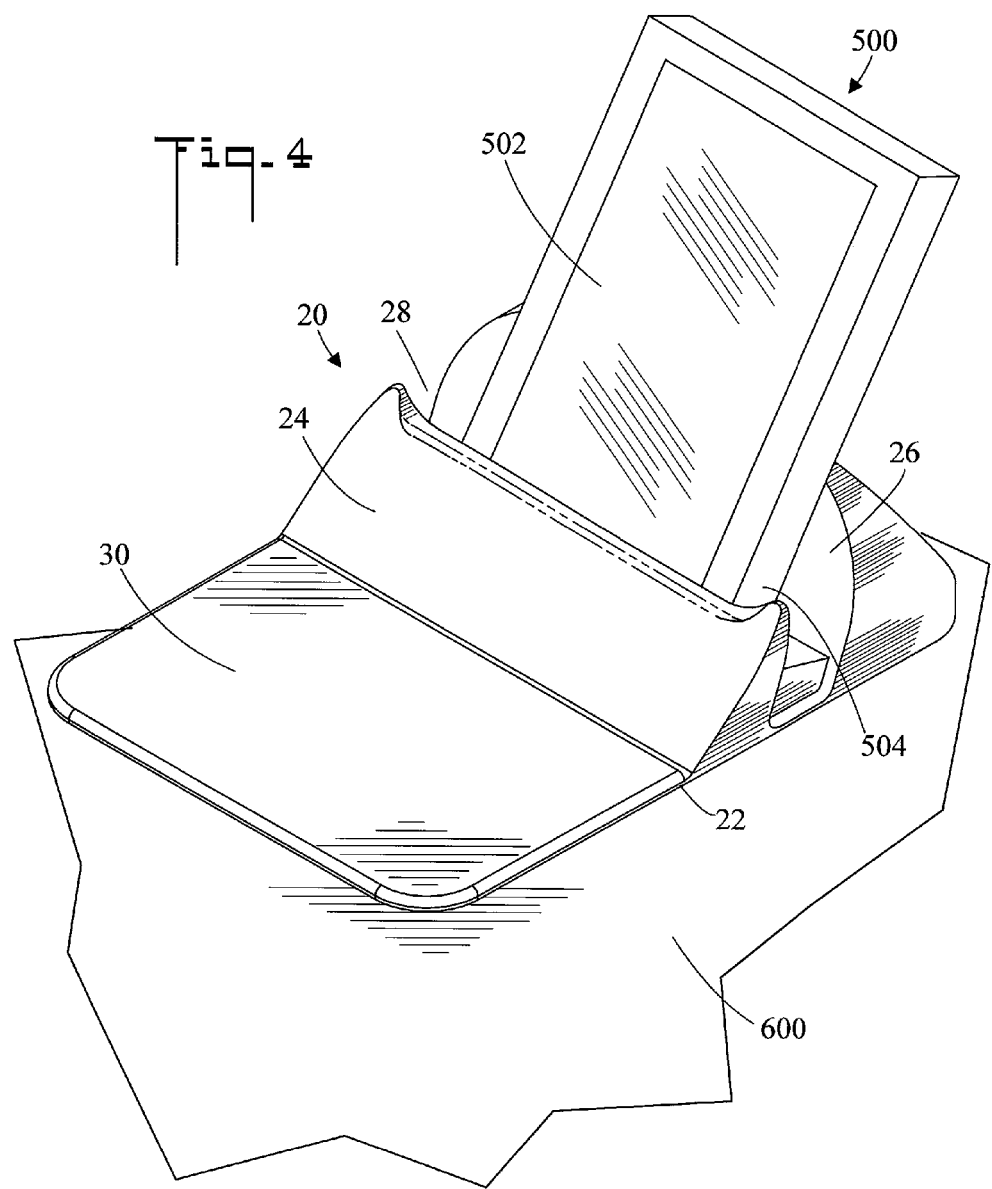

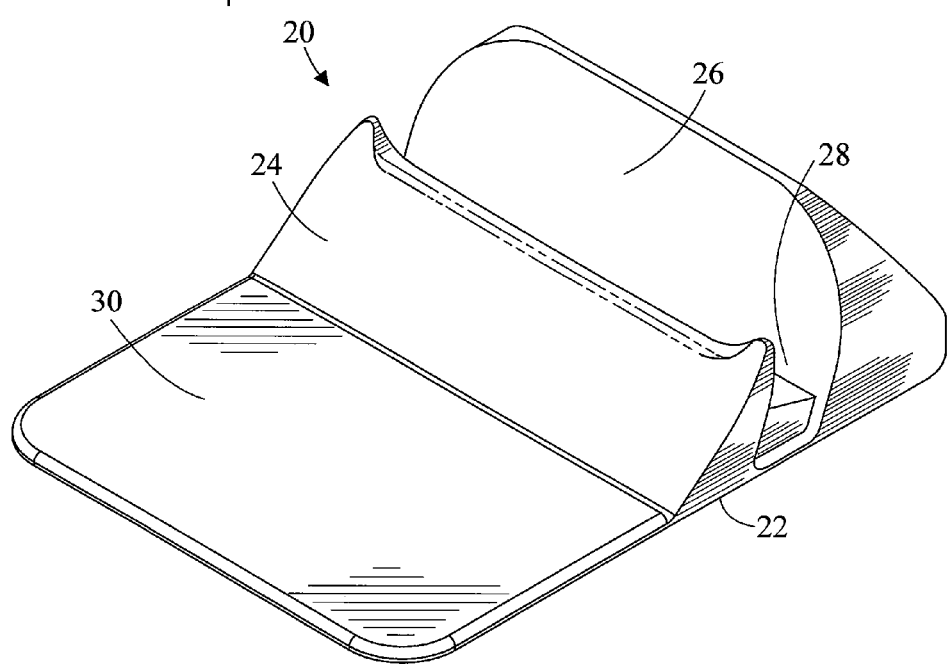

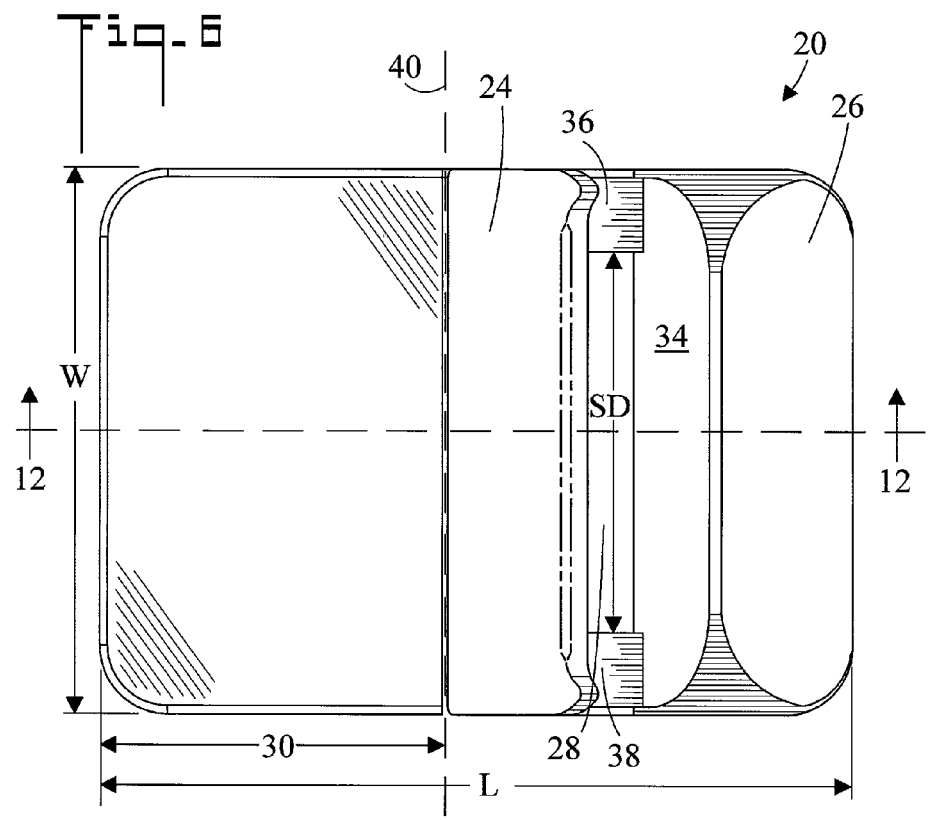
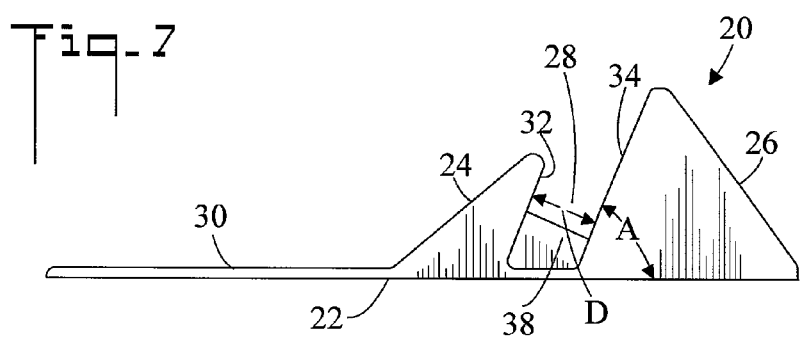

Fig_11

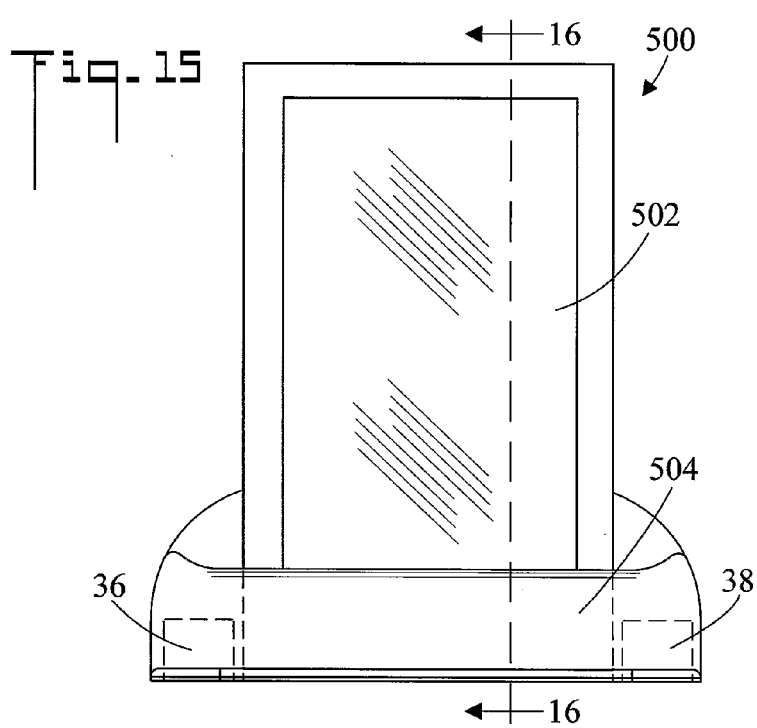

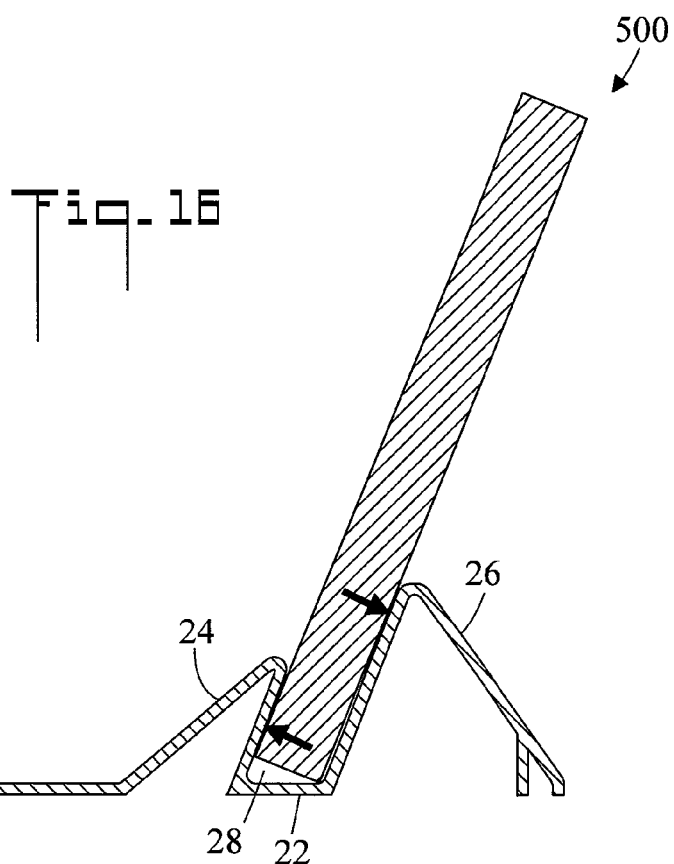

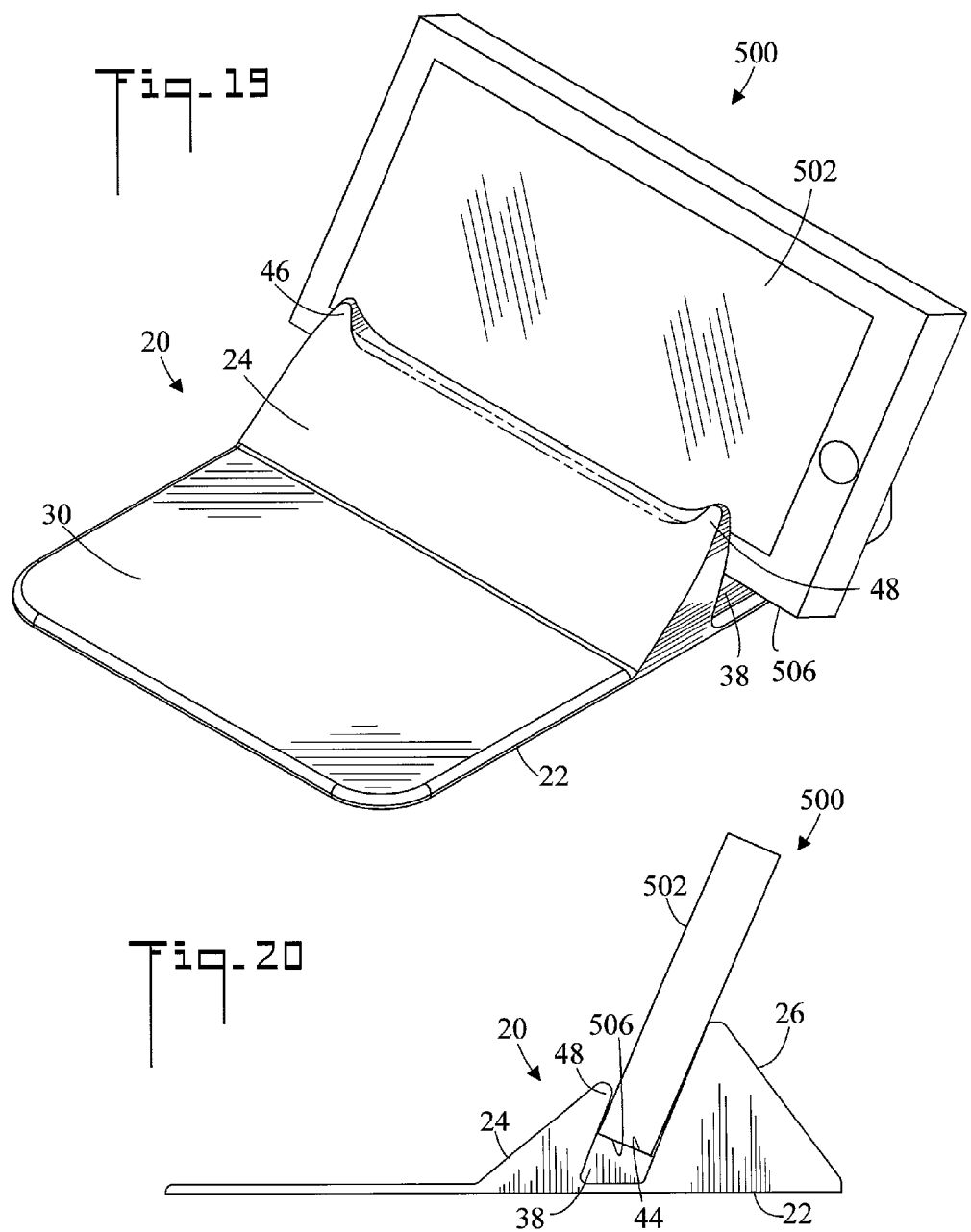

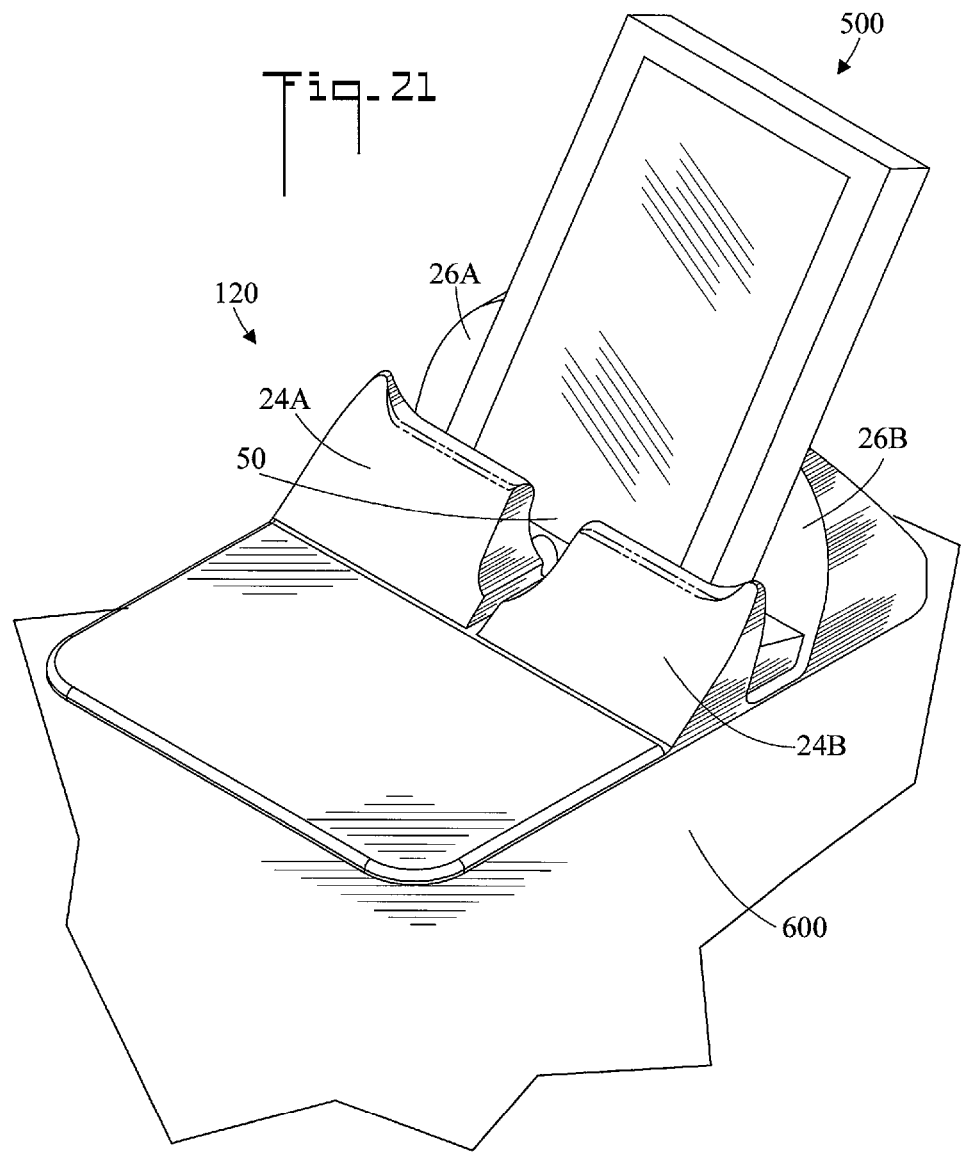

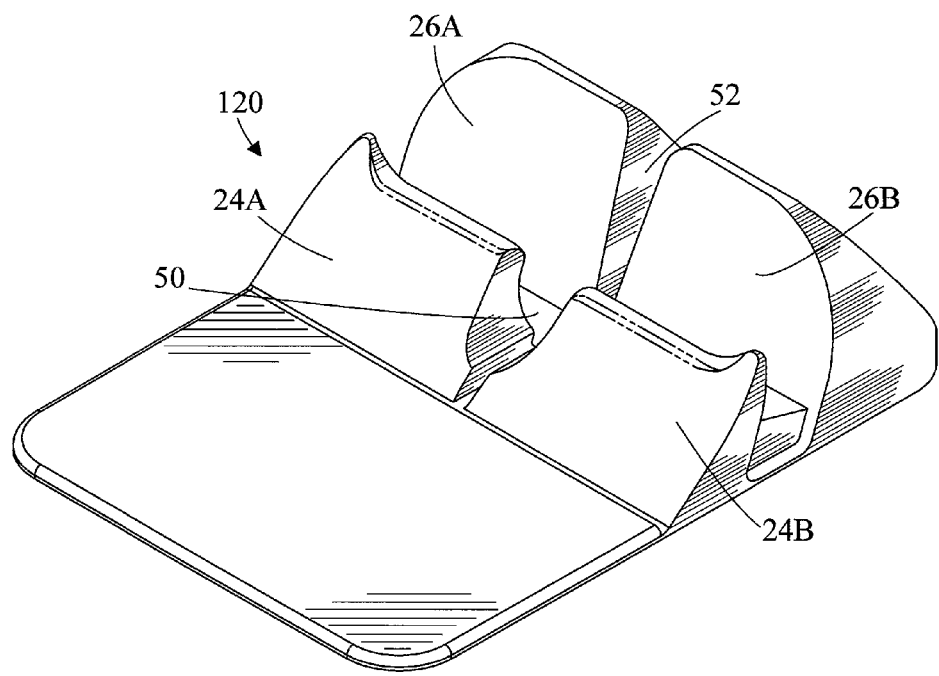

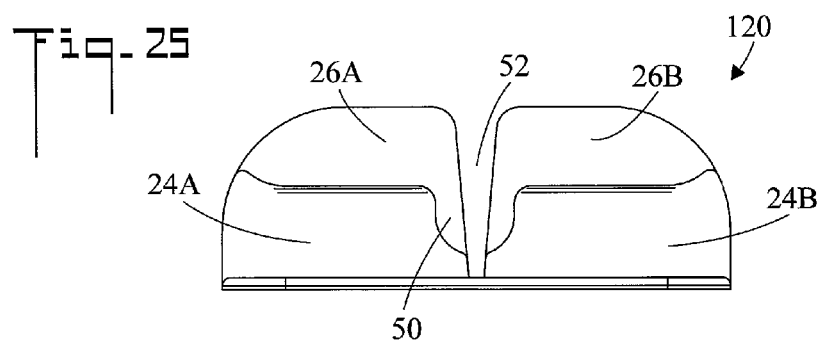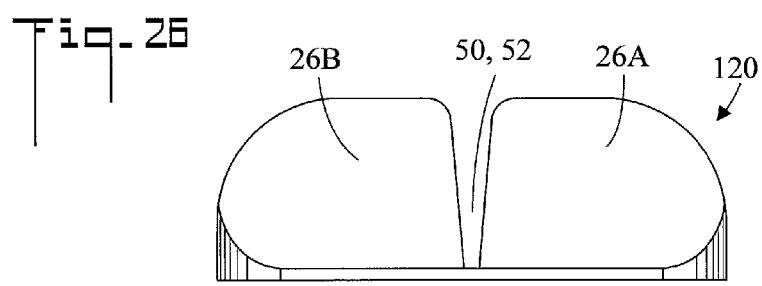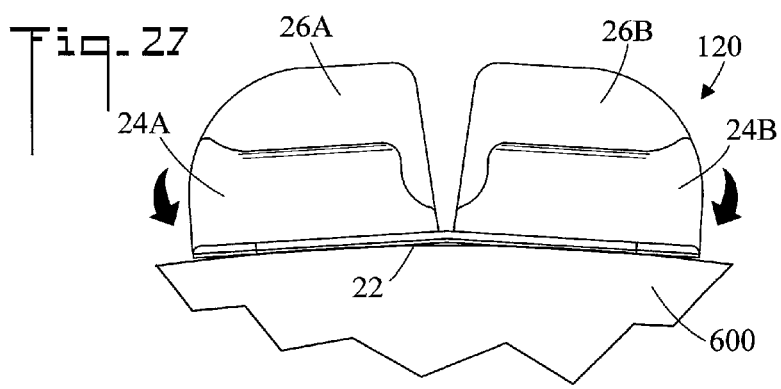

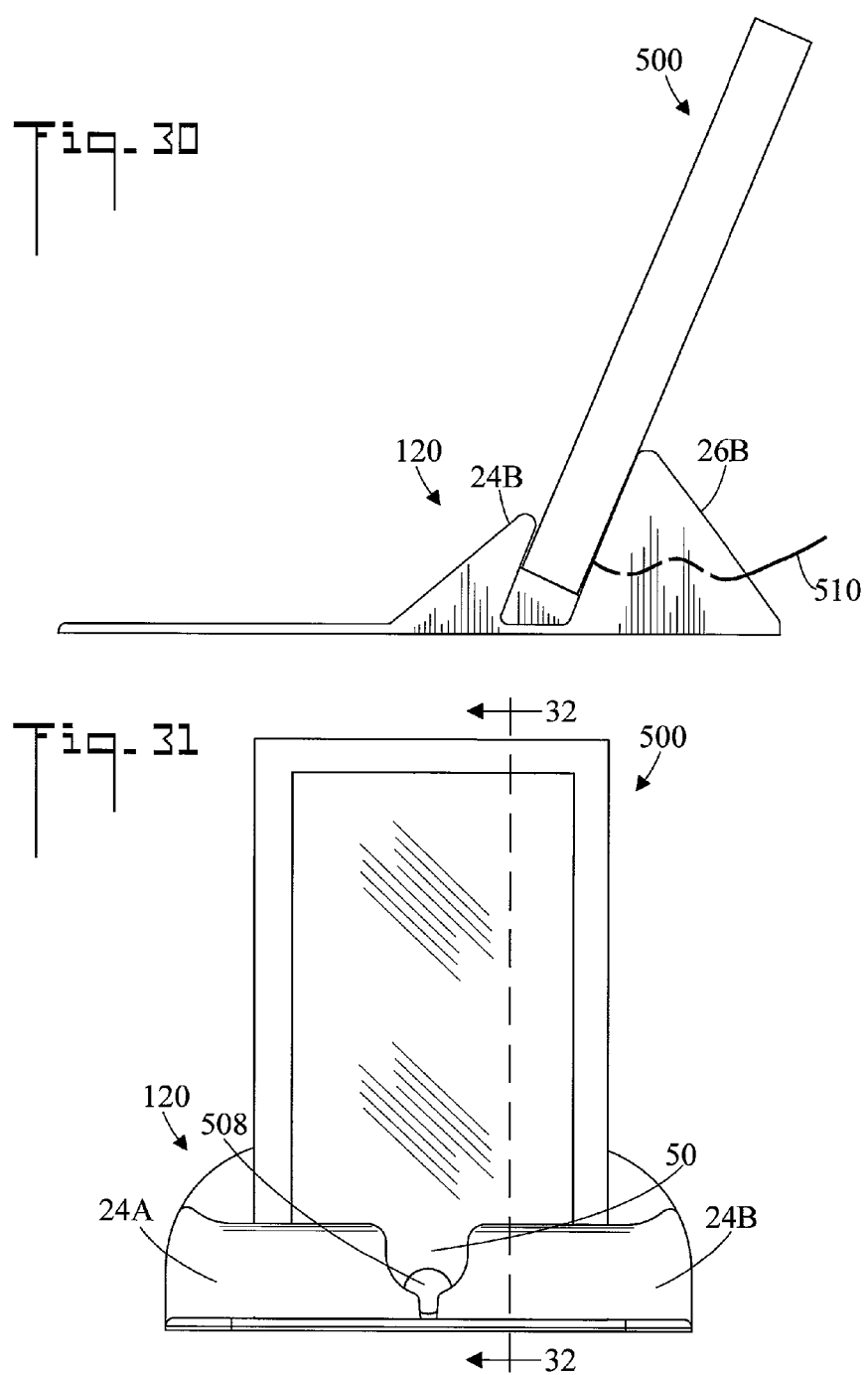

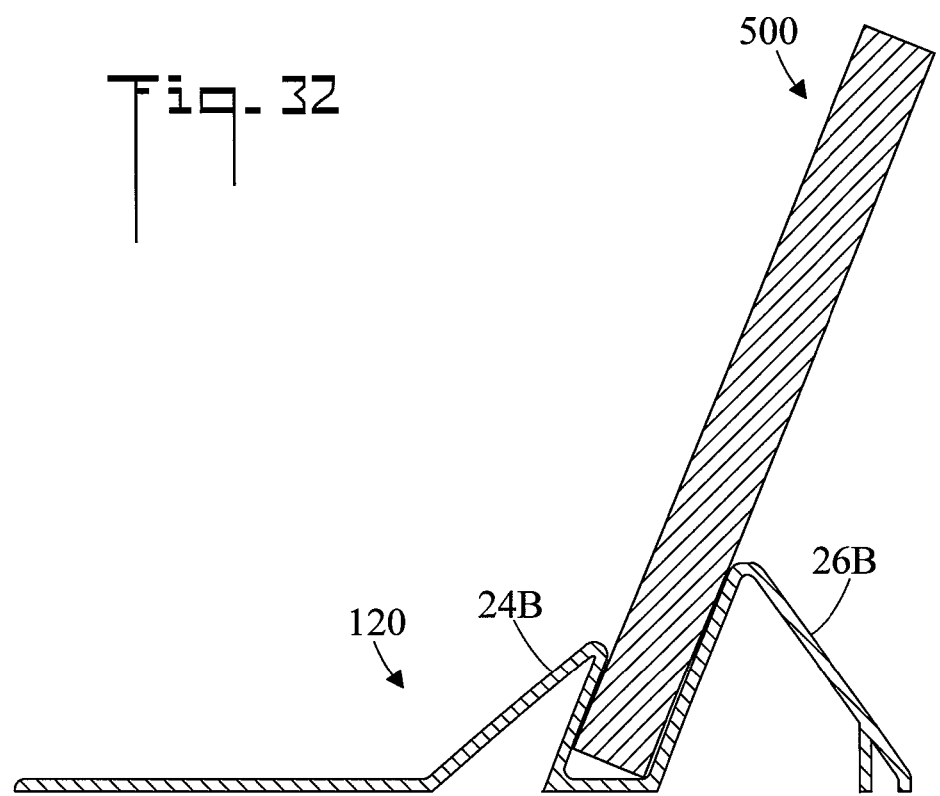

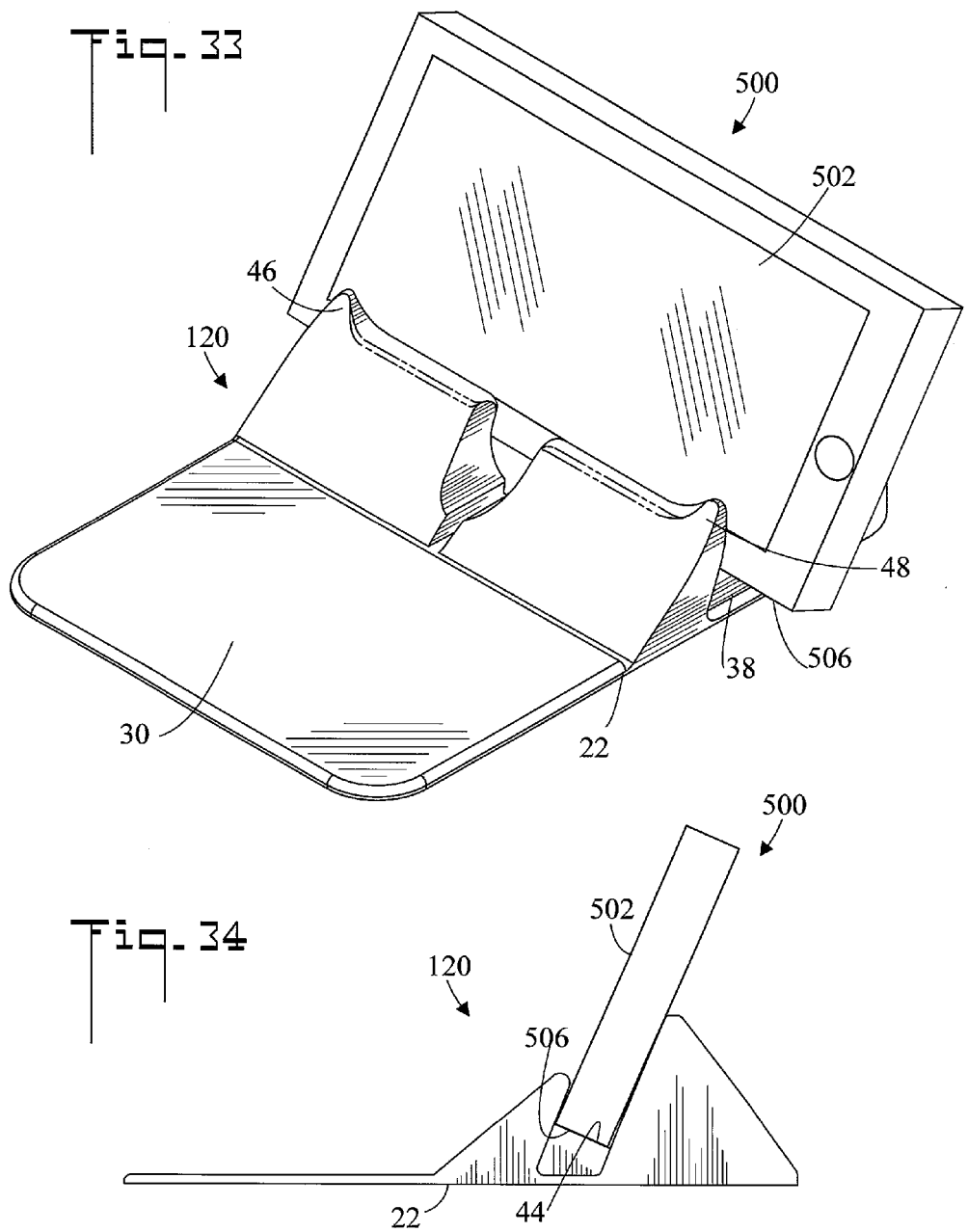

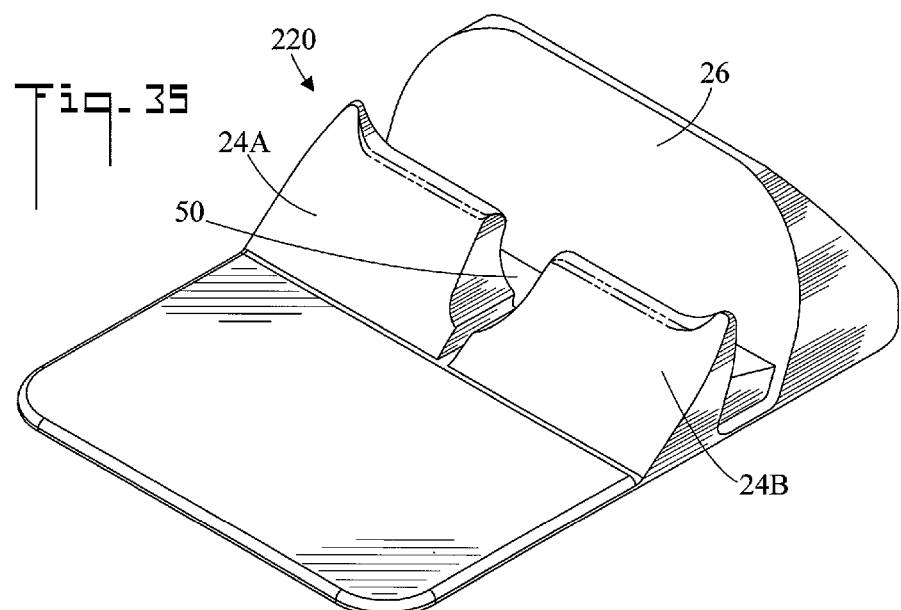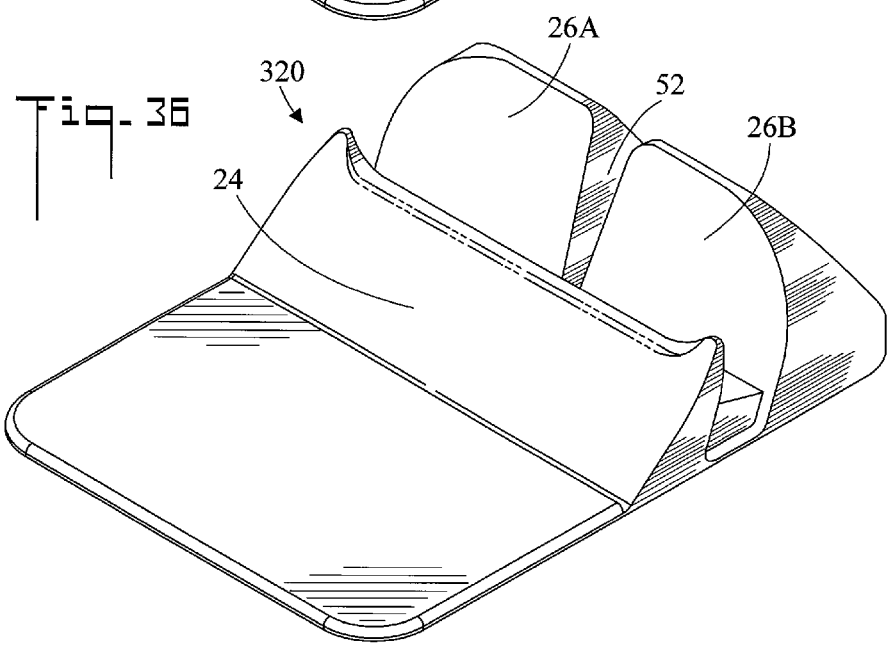

HOLDER FOR AN ELECTRONIC DEVICE

CROSS REFERENCE TO RELATED APPLICATION

This application claims the filing benefit under 35 U.S.C. §119(e) of U.S. Provisional Application No. 61/629,794, filed Nov. 28, 2011, which is hereby incorporated by reference.

TECHNICAL FIELD

The present invention pertains generally to hand-held electronic devices, and more particularly to a holder for the electronic device, the holder being positionable on a support surface so that the electronic device is visible to a user.

BACKGROUND OF THE INVENTION

Hand-held electronic devices such as cell phones, smart phones, iPhones®, iPads®, tablets, GPS navigation units, and the like are commonplace in today's society. When users of these devices are in the vicinity of a support surface (such as dashboard of a motor vehicle, a desk, a table, etc.) it can be advantageous to provide a holder which allows convenient electronic device viewing and operation. Device holders are known in the art, however most require a suction cup or some other hard mounting apparatus for attaching the holder to the support surface.

BRIEF SUMMARY OF THE INVENTION

The present invention is directed to a holder which holds an electronic device without having to hard mount the electronic device to a support surface. The holder comprises a "caddy" which rests upon the support surface and holds the electronic device at an angle which provides convenient viewing and operation. The holder requires no mounting hardware, and can hold the electronic device in either a vertical position or a horizontal position. The holder is made of flexible resilient material having sticky properties (materials such as Styrofoam®, rubber, silicone, a synthetic polymer, etc.) and has a flat flexible base which both conforms to and sticks to the support surface. The holder includes front and rear supports between which the electronic device is installed. By friction the supports grip the electronic device and hold it in place. Unlike suction cup devices or other holders which are designed for a specific electronic device, the holder is universal in both its function to hold electronic devices, and its ability to fit the form of multiple support surfaces to maintain the holder in convenient view of the user. The holder is easily installed and removed from the support surface, and accommodates the easy installation and removal of many styles and shapes of electronic devices, while simultaneously providing an unobstructed view of the device's display and controls.

In accordance with an embodiment, a holder for positioning an electronic device on a support surface includes a base. At least one front support is connected to and outwardly projects from the base, and at least one rear support is also connected to and outwardly projects from the base. The rear support is spaced apart from the front support defining a cavity therebetween, the cavity being shaped and dimensioned to receive the electronic device. The base is positionable on the support surface.

In accordance with another embodiment, the front support is shorter than the rear support.

In accordance with another embodiment, the front support has a rear surface and the rear support has a front surface. The rear surface of the front support and the front surface of the rear support form the same angle with the base.

In accordance with another embodiment, the angle is 75°±10°.

In accordance with another embodiment, the base, the front support, and the rear support are fabricated from a flexible resilient friction enhancing material.

In accordance with another embodiment, the front support has a first end and an opposite second end. A first upwardly projecting ear is disposed at first end, and a second upwardly projecting ear is disposed at second end.

In accordance with another embodiment, a first stop is disposed between the front support and the rear support. A second stop is disposed between the front support and the rear support. The first stop is spaced apart from the second stop so that the bottom part of the electronic device can be inserted therebetween.

In accordance with another embodiment, the first stop has a first top surface and the second stop has a second top surface. The side of the electronic device is positionable on the first and second top surfaces.

In accordance with another embodiment, the base includes a front flap. The front flap is flexibly connected to the front support, so that the base can longitudinally conform to the support surface.

In accordance with another embodiment, a shim is positionable between the electronic device and either the front support or the rear support.

In accordance with another embodiment, the holder includes a first front support and a second front support. The first and second front supports reside in spaced apart side-by-side relationship and are separated by a front support gap. The holder further includes a first rear support and a second rear support. The first and second rear supports reside in spaced apart side-by-side relationship separated by a rear support gap.

In accordance with another embodiment, a first stop is disposed between the first front support and the first rear support. A second stop is disposed between the second front support and the second rear support. The first stop is spaced apart from the second stop so that the bottom part of the electronic device can be inserted therebetween.

In accordance with another embodiment, the first front support has a first upwardly projecting ear, and the second front support has a second upwardly projecting ear.

In accordance with another embodiment, the front support gap allows user access to the electronic device control.

In accordance with another embodiment, the rear support gap allows passage of an attached cable.

In accordance with another embodiment, the first front support is flexibly connected to the second front support, and the first rear support is flexibly connected to the second rear support, so that the base can transversely conform to the support surface.

In accordance with another embodiment, the holder includes a first front support and a second front support, said first and second front supports residing in spaced apart side-by-side relationship separated by a front support gap. The holder having a single rear support.

In accordance with another embodiment, the holder includes a first rear support and a second rear support, said first and second rear supports residing in spaced apart side-by-side relationship separated by a rear support gap. The holder having a single front support.

Other embodiments, in addition to the embodiments enumerated above, will become apparent from the following detailed description, taken in conjunction with the accompanying drawings, which illustrate, by way of example, the principles of the holder and method of use.

BRIEF DESCRIPTION OF THE DRAWINGS

FIG. 1 is front elevation view of a prior art electronic device;

FIG. 2 is a side elevation view of the electronic device;

FIG. 3 is a top plan view of the electronic device;

FIG. 4 is a perspective view of a holder for an electronic device placed upon a support surface with the electronic device installed in the holder;

FIG. 5 is a perspective view of the holder;

FIG. 6 is a top plan view of the holder;

FIG. 7 is a side elevation view of the holder;

FIG. 14 is a side elevation view of the holder with the electronic device installed;

FIG. 15 is a front elevation view of the holder with the electronic device installed;

FIG. 16 is a cross sectional view along the line 16-16 of FIG. 15;

FIG. 19 is a perspective view of the holder with the electronic device installed horizontally;

FIG. 20 is a side elevation view of the holder with the electronic device installed horizontally;

FIG. 21 is a perspective view of a second embodiment holder placed upon a support surface with an electronic device installed in the holder;

FIG. 22 is a perspective view of the second embodiment holder;

FIG. 25 is a front elevation view of the second embodiment holder;

FIG. 26 is a rear elevation view of the second embodiment holder;

FIG. 27 is a front elevation view of the second embodiment holder conforming to the support surface;

FIG. 30 is a side elevation view of the second embodiment holder with the electronic device installed and an attached cable;

FIG. 31 is a front elevation view of the second embodiment holder with the electronic device and a conrol;

FIG. 32 is a cross sectional view along the line 32-32 of FIG. 31;

FIG. 33 is a perspective view of the second embodiment holder with the electronic device installed horizontally;

FIG. 34 is a side elevation view of the second embodiment holder with the electronic device installed horizontally;

FIG. 35 is a perspective view of a third embodiment holder; and,

FIG. 36 is a perspective view of a fourth embodiment holder.

DETAILED DESCRIPTION OF THE INVENTION

Figure 8:
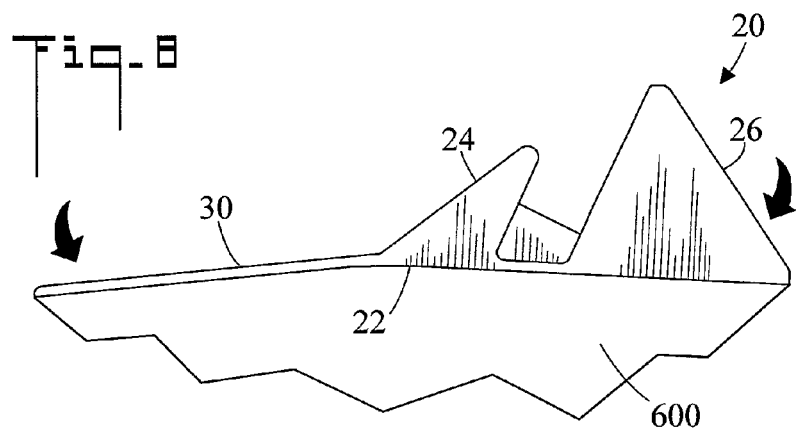
FIG. 8 is a side elevation view of the holder conforming to the support surface.

Referring initially to FIGS. 1-3, there are illustrated front elevation, side elevation, and top plan views respectively of a prior art electronic device 500. In the shown embodiment, electronic device 500 is a handheld device such as a cell phone, smart phone, iPhone®, iPad®. tablet, GPS device, or other small electronic device which can be either vertically or horizontally viewed (refer to FIGS. 4 and 19 respectively). Electronic device 500 includes a screen 502, a bottom part 504, a side 506, and a user control 508. It may be appreciated that electronic device 500 could also include a protective cover.

Now referring to FIG. 4, there is illustrated a perspective view of a holder 20 for an electronic device 500. Holder 20 is shown placed upon a cooperating support surface 600 with electronic device 500 installed therein. Holder 20 holds electronic device 500 so that the electronic device (i.e. the screen 502 and/or controls) is visible to a user. FIG. 5 is a perspective view of holder 20. In one embodiment support surface 600 is the dashboard of motor vehicle, but could also be a desk, table, or the like. Holder 20 includes a base 22 (also refer to FIG. 7) which is positionable upon support surface 600. At least one front support 24 is connected to and outwardly projects from base 22 (refer also to FIG. 7). In the shown in use base-down position of FIGS. 4-5, front support 24 projects in a general upward direction from base 22. At least one rear support 26 is connected to and outwardly projects from base 22, rear support 26 is spaced apart from front support 24 thereby defining a cavity 28 therebetween. Cavity 28 is shaped and dimensioned to receive electronic device 500. As shown in FIG. 4, cavity 28 receives lower part 504 of electronic device 500 so that electronic device 500 is disposed vertically. Cavity 28 can also receive side 506 so that electronic device 500 is disposed horizontally (refer to FIGS. 19-20). It may be appreciated that electronic device 500 can be installed in holder 20 either before or after base 22 of holder 20 is positioned on support surface 600.

In an embodiment, base 22, front support 24, and rear support 26 are fabricated from a flexible resilient friction-enhancing material (such as silicone or rubber). The sticky nature of the material causes holder 20 to grip and stick (in place) to support surface 600, and to grip and stick to electronic device 500. Such materials are available from 3M® or other manufacturers. Moreover, base 22 includes a front flap 30 (also refer to FIG. 7). Front flap 30 creates greater friction-producing surface area, adds weight and adhesion to holder 20, and counter balances the weight of electronic device 500. In the shown embodiment, front flap 30 comprises approximately half of the length L of holder 20. The combination of base 22, front support 24, rear support 26, and friction-enhancing property of holder 20 creates a versatile and flexible electronic device 500 holder which can be easily placed on and removed from support surface 600.

FIGS. 6-7 are top plan and side elevation views respectively of holder 20. The opposite side elevation view is the mirror image of FIG. 7. Front support 24 is shorter than rear support 26. This enables more of the screen 502 of electronic device 500 to be seen (refer to FIG. 4). Front support 24 has a rear surface 32, and rear support 26 has a front surface 34.

Rear surface 32 and front surface 34 abut electronic device 500 when it is installed in holder 20 (refer also to FIG. 14). In the shown embodiment rear surface 32 and front surface 34 are flat and parallel. Rear surface 32 and front surface 34 form an angle A with base 22. In the shown embodiment angle A is 75°±10°. In the shown embodiment holder 20 has a length L of about 5.5 inches, a width W of about 4 inches., and a distance D between front support 24 and rear support 26 of about 0.5 inches.

A first stop 36 is disposed between front support 24 and rear support 26, and a second stop 38 is also disposed between front support 24 and rear support 26. First stop 36 is spaced apart (a stop distance SD) from second stop 38 so that bottom part 504 of electronic device 500 can be inserted therebetween, and electronic device 500 resides in a vertical position (refer also to FIGS. 4, and 13-15). In the shown embodiment stop distance SD between first stop 36 and second stop 38 is about 2.75 inches. First 36 and second 38 stops serve to hold electronic device 500 in place within holder 20 (refer also to FIG. 13). Stop distance SD between stops 36 and 38 is wide enough to accommodate electronic device 500 if placed in a vertical position (refer to FIGS. 4, and 13-15), but not wide enough the accommodate electronic device 500 if placed in a horizontal position (refer to FIGS. 19-20). If electronic device 500 is vertically placed into holder 20, it is placed between stops 36 and 38 so that the device downwardly extends in cavity 28 to base 22, and as such front support 24 and rear support 26 provide maximum device stability (refer to FIG. 16). That is, in the vertical position, electronic device 500 will sit deeper in cavity 28 in the grasp of front support 24 and rear support 26 to better secure the electronic device 500 and accommodate the added weight at the top which will force a tighter grip at the bottom due to the angle of the front support 24 and rear support 26. Further, in the vertical position, stops 36 and 38 serve to laterally keep electronic device 500 in holder 20 (refer to FIG. 13).

FIG. 8 is a side elevation view of holder 20 conforming to support surface 600. As shown support surface 600 is curved such as the curved dashboard of a motor vehicle. Base 22 includes a front flap 30 which is flexibly connected to front support 24 along axis 40 (refer to FIG. 6), so that base 22 can longitudinally conform (along length L) to support surface 600. By conforming to support surface 600, the friction between holder 20 and support surface 600 is increased.

Figure 9:
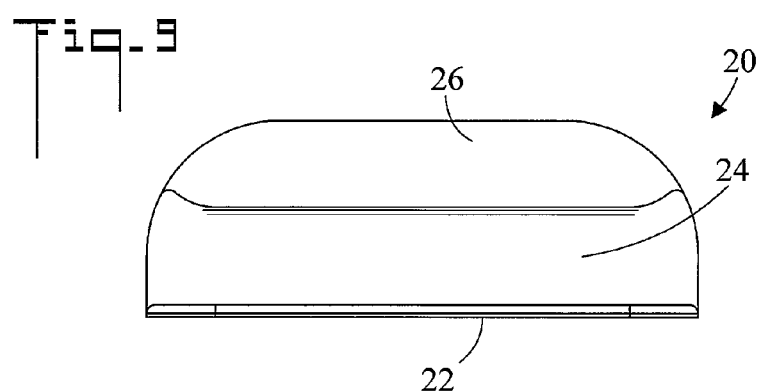
FIG. 9 is a front elevation view of the holder.

FIG. 9 is a front elevation view of the holder 20 showing front support 24, rear support 26, and base 22.

Figure 10:
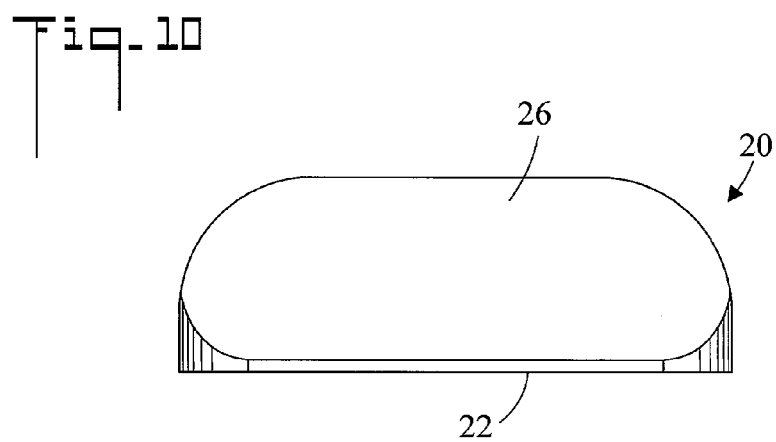
FIG. 10 is a rear elevation view of the holder.

FIG. 10 is a rear elevation view of holder 20 showing base 22 and rear support 26.

Figure 11:
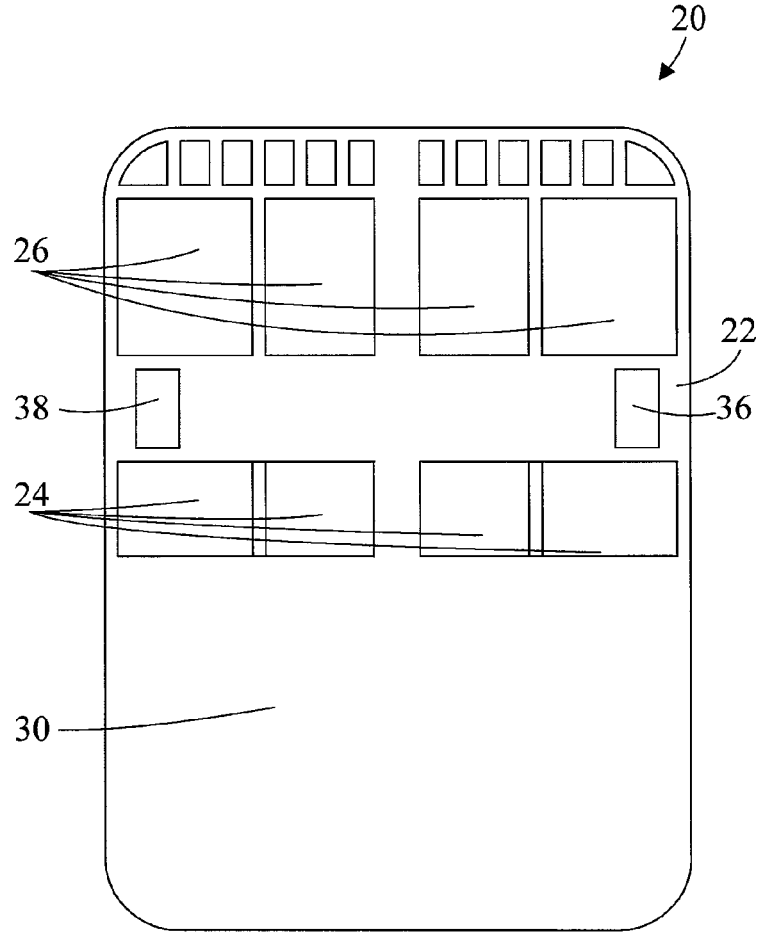
FIG. 11 is a bottom plan view of the holder.

FIG. 11 is a bottom plan view of holder 20. In the shown embodiment, front support 24, rear support 26, and first and second stops 36 and 38 respectively are hollow as depicted by the rectangular voids (refer also to FIG. 12).

Figure 12:
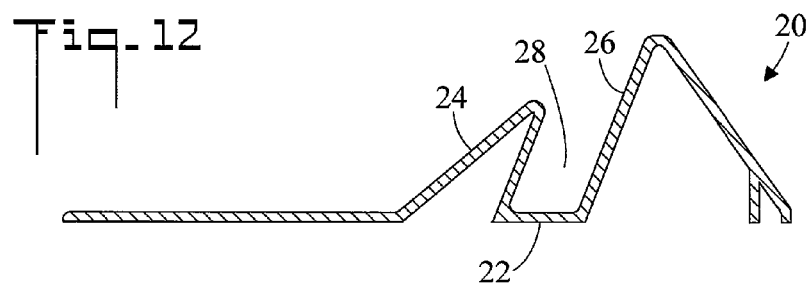
FIG. 12 is a cross sectional view along line 12-12 of FIG. 6

FIG. 12 is a cross sectional view along line 12-12 of FIG. 6 showing hollow front support 24 and rear support 26, cavity 28, and base 22.

Figure 13:
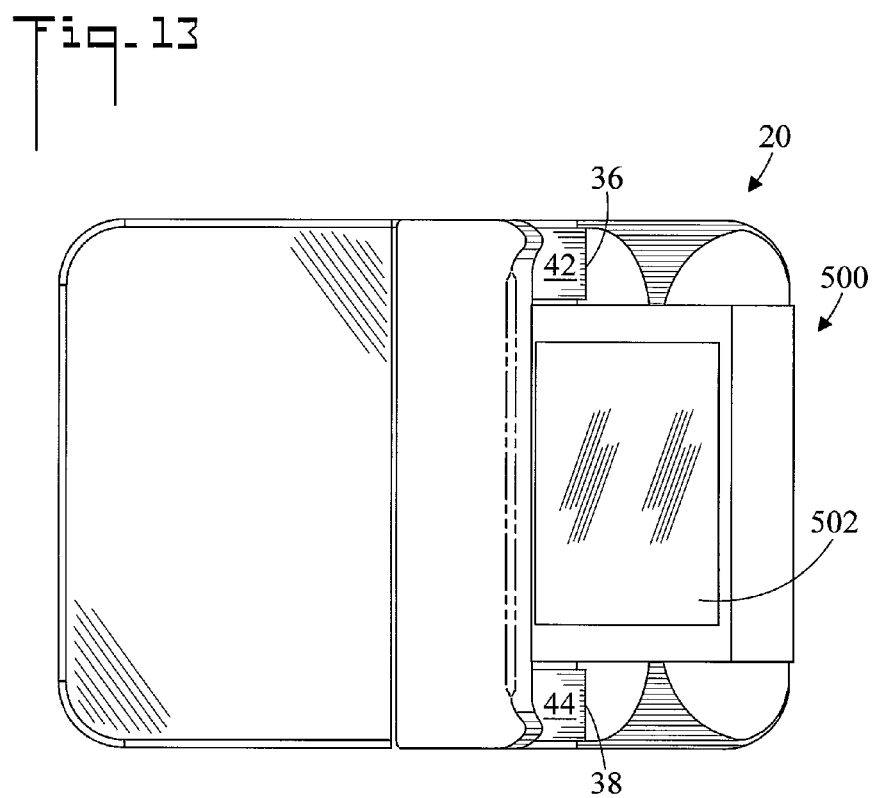
FIG. 13 is a top plan view of the holder with the electronic device installed.

FIGS. 13-15 are top plan, side elevation, and front elevation views respectively with electronic device 500 installed, and FIG. 16 is a cross sectional view along line 16-16 of FIG. 15. In this embodiment, electronic device 500 is installed in a vertical position as in FIG. 4. The bottom part 504 of electronic device 500 is placed in cavity 28 (refer to FIG. 12) so that it resides between first stop 36 and second stop 38 (FIG. 13) It is noted that electronic device 500 can even be slightly wider than stop distance SD (refer to FIG. 6), wherein first stop 36 and second stop 38 can resiliently stretch to accommodate electronic device 500. Electronic device 500 abuts and is held in place within cavity 28 by rear surface 32 of front support 24 and front surface 34 of rear support 26. Because front support 24 and rear support 26 are angled, the weight of electronic device 500 causes it to exert force on both front support 24 and rear support 26 as is indicated by the arrows. These forces produce the necessary friction to firmly hold electronic device 500 in place within holder 20. Front support 24 and rear support 26 are specifically angled so that the screen 502 of electronic device 500 resides at a convenient angle for viewing. In some cases, the angle can be adjusted slightly depending upon how electronic device 500 is inserted (also refer to FIGS. 17 and 18 and the associated discussions).

Figure 17:
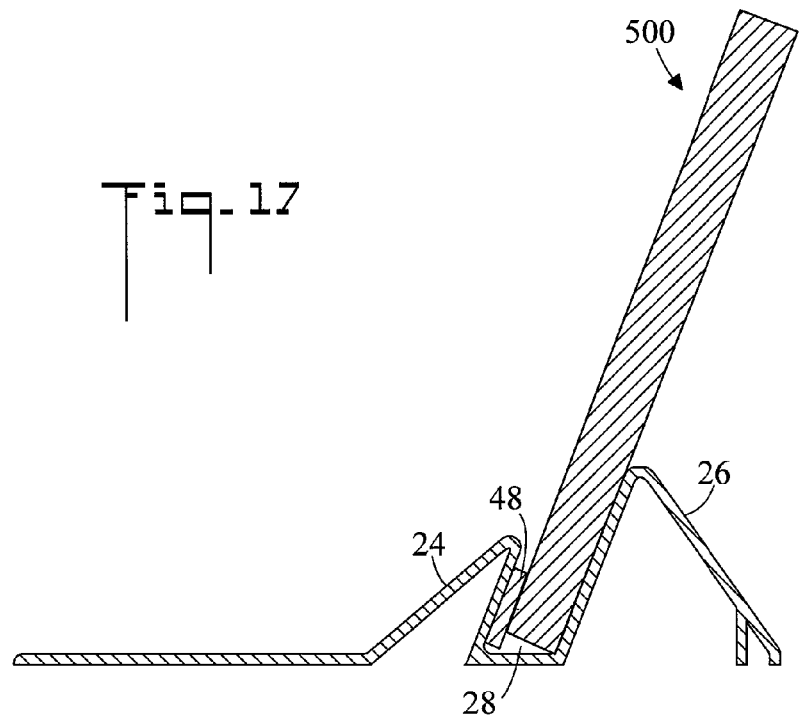
FIG. 17 is a cross sectional view as in FIG. 16.
Figure 18:
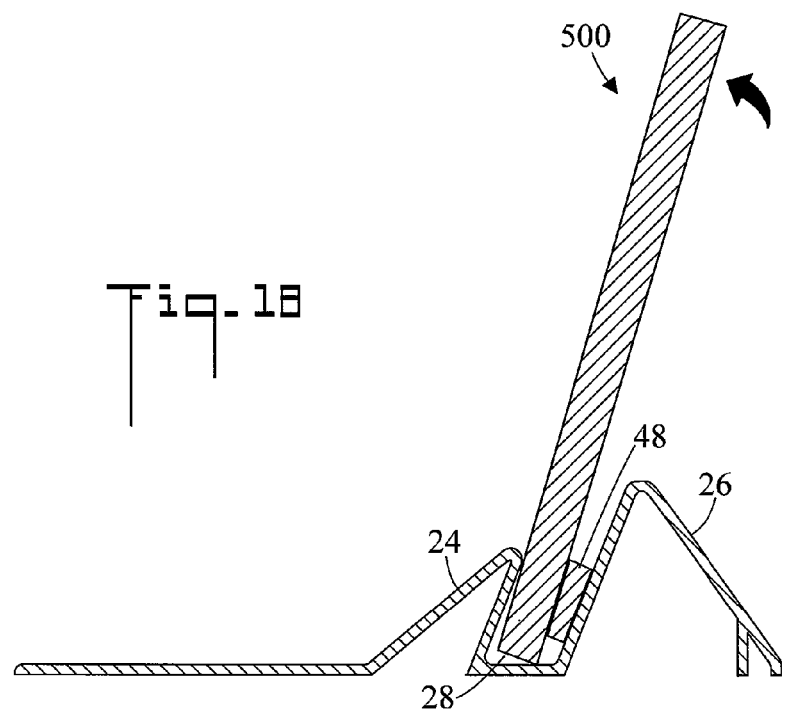
FIG. 18 is another cross sectional view as in FIG. 16.

FIG. 17 is a cross sectional view as in FIG. 16, and FIG. 18 is another cross sectional view as in FIG. 16. A shim 48 is positionable between electronic device 500 and either front support 24 or rear support 26. In FIG. 17, because electronic device 500 is thinner than cavity 28, shim 48 is placed between electronic device 500 and front support 24, and thereby ensures a tight fit. In FIG. 18 shim 48 is placed between electronic device 500 and rear support 26. Additionally in this instance, shim 48 is used to change the viewing angle of electronic device 500.

FIGS. 19-20 are perspective and side elevation views respectively of holder 20 with electronic device 500 installed horizontally. First stop 36 has a first top surface 42 and second stop 38 has a second top surface 44 (refer to FIG. 13). In the horizontal position, side 506 of electronic device 500 is positionable on first 42 and second 44 top surfaces. As such, electronic device 500 rests upon top surfaces 42 and 44 and screen 502 of electronic device 500 is raised up (from base 22) for better viewing. Front support 24 has a first end and an opposite second end. A first upwardly projecting ear 46 is disposed at the first end, and a second upwardly projecting ear 48 is disposed at the second end. Because in the horizontal position electronic device 500 reside higher up in holder 20, ears 46 and 48 serve to form a barrier which helps prevent electronic device 500 from falling forward (toward flap 30) and out of holder 20.

FIG. 21 is a perspective view of a second embodiment holder, generally designated as 120, placed upon a support surface 600 with an electronic device 500 installed. FIG. 22 is a perspective view of the second embodiment holder 120. Holder 120 is the same as holder 20 except that holder 120 includes two front supports separated by a gap, and two rear support also separated by a gap. Holder 120 includes a first front support 24A and a second front support 24B which reside in spaced apart side-by-side relationship separated by a front support gap 50. Holder 120 further includes a first rear support 26A and a second rear support 26B which reside in spaced apart side-by-side relationship separated by a rear support gap 52.

FIGS. 23-26 are top plan, side elevation, front elevation, and rear elevation views respectively of holder 120. A first stop 36 is disposed between first front support 24A and first rear support 26A. A second stop 38 is disposed between second front support 24B and second rear support 26B. First stop 36 is spaced apart from second stop 38 so that bottom part 504 of electronic device 500 can be inserted therebetween (refer also to FIG. 29).

FIG. 27 is a front elevation view of second embodiment holder 120 conforming to support surface 600. First front support 24A is flexibly connected to second front support 24B, an first rear support 26A is flexibly connected to second rear support 26B, so that base 22 can transversely conform about axis 54 (refer to FIG. 23) to support surface 600 (such as the curved dashboard of a motor vehicle).

Figure 23:
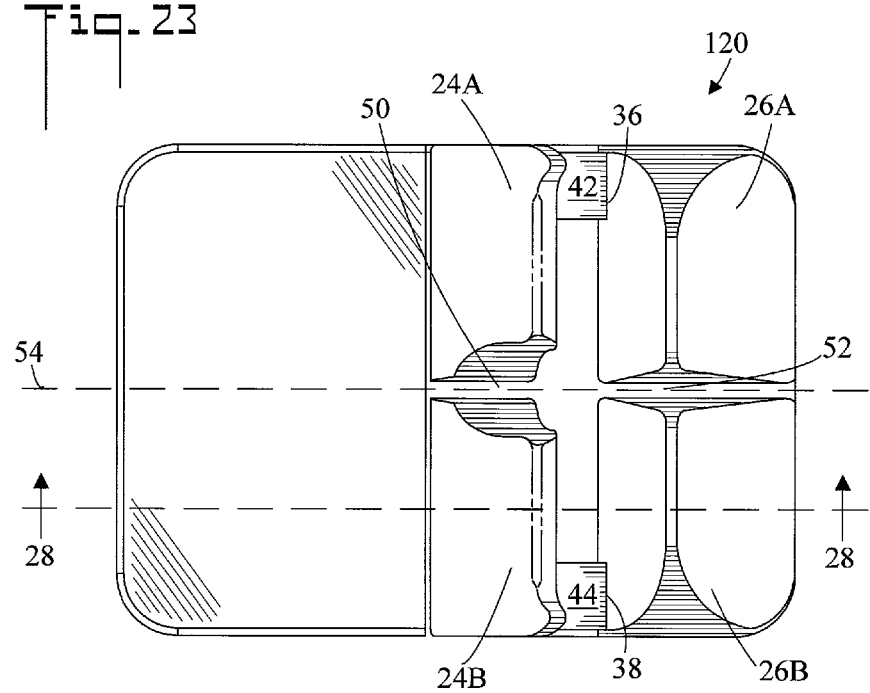
FIG. 23 is a top plan view of the second embodiment holder.
Figure 24:
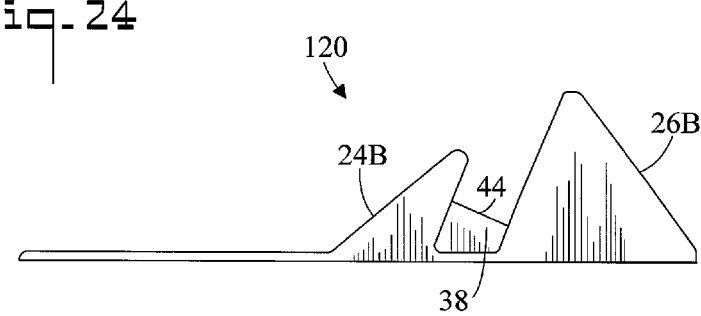
FIG. 24 is a side elevation view of the second embodiment holder.
Figure 28:
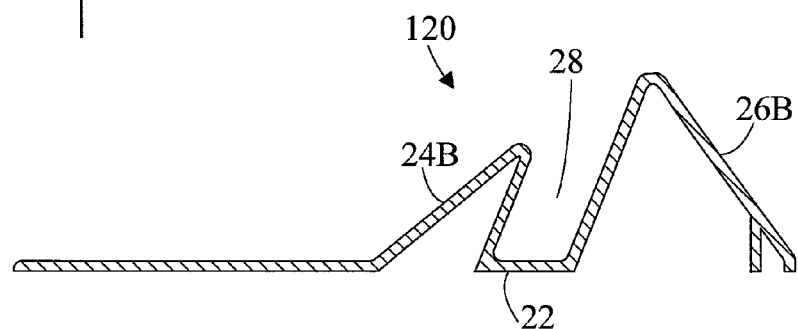
FIG. 28 is a cross sectional view along the line 28-28 of FIG. 23.

FIG. 28 is a cross sectional view along the line 28-28 of FIG. 23 showing hollow first support 24B, hollow second support 26B, and cavity 28.

Figure 29:
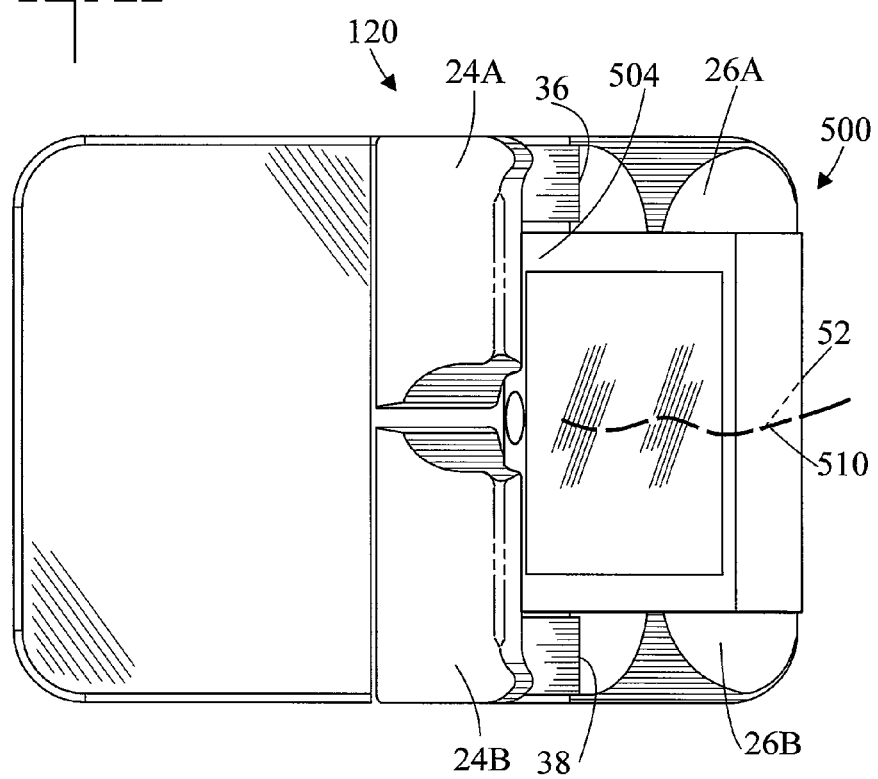
FIG. 29 is top plan view of the second embodiment holder with the electronic device installed.

FIGS. 29-31 are top plan, side elevation, and front elevation views of the second embodiment holder 120 with electronic device 500 installed in a vertical position. Referring particularly to FIGS. 29 and 31, first gap 50 between first front support 24A and second front support 24B allows user access to control 508 of electronic device 500. Referring particularly to FIGS. 29 and 30, electronic device 500 includes an attached cable 510. Second gap 52 between first rear support 26A and second rear support 26B allows passage of attached cable 510.

FIG. 32 is a cross sectional view along the line 32-32 of FIG. 31 showing holder 120, second front support 24B, second rear support 26B, and electronic device 500.

FIG. 33-34 are perspective and side elevation views respectively of second embodiment holder 120 with electronic device 500 installed horizontally. First stop 36 has a first top surface 42 and second stop 38 has a second top surface 44 (refer to FIG. 23). In the horizontal position, side 506 of electronic device 500 is positionable on first 44 and second 46 top surfaces. As such, electronic device 500 rests upon top surfaces 42 and 44 and screen 502 of electronic device 500 is raised up (from base 22) for better viewing. First front support 24A has a first upwardly projecting ear 46, and second front support 24B has a second upwardly projecting ear 48. Because in the horizontal position electronic device 500 resides higher up in holder 20, ears 46 and 48 serve to form a barrier which helps prevent electronic device 500 from falling forward (toward flap 30) and out of holder 20.

FIG. 35 is a perspective view of a third embodiment holder, generally designated as 220. Holder 220 includes a first front support 24A and a second front support 24B which reside in spaced apart side-by-side relationship separated by a front support gap 50. In this variation there are two front supports 24A and 24B, but only a single rear support 26.

FIG. 36 is a perspective view of a fourth embodiment holder, generally designated as 320. Holder 320 includes a first rear support 26A and a second rear support 26B which reside in spaced apart side-by-side relationship separated by a rear support gap 52. In this variation there are two rear supports 26A and 26B, but only a single front support 24.

In terms of use, a method for positioning an electronic device 500 on a support surface 600 includes: (refer to FIGS. 1-36)
(a) providing an electronic device 500 having a bottom part 504 and a side 506;
(b) providing a support surface 600;
(c) providing a holder 20* for electronic device 500, holder 20 including;
 a base 22;
 at least one front support 24 connected to and outwardly projecting from base 22;
 at least one rear support 26 connected to and outwardly projecting from base 22, rear 26 support spaced apart from front 24 support defining a cavity 28 therebetween which is shaped and dimensioned to receive electronic device 500;
(d) installing electronic device 500 in holder 20; and,
(e) positioning base 22 on support surface 500.
 * or 120, 220, or 330

The method further including:
in (c), base 22 fabricated from a flexible resilient friction enhancing material so that in (e) base 22 conforms to and grips support surface 600.

The method further including:
in (c), base 22 including a front flap 30; and,
front flap 30 flexibly connected to front support 24, so that in (e) base 22 can longitudinally conform to support surface 600.

The method further including:
in (c), a first stop 36 disposed between front support 24 and rear support 26;
in (c), a second stop 38 disposed between front support 24 and rear support 26, first stop 24 spaced apart from second stop 26 so that bottom part 504 of electronic device 500 can be inserted therebetween; and,
in (d), inserting bottom part 504 of electronic device 500 between first stop 36 and second stop 38.

The method further including:
in (c), a first stop 36 disposed between front support 24 and rear support 26;
in (c), a second stop 38 disposed between front support 24 and rear support 26;
in (c), first stop 24 having a first top surface 42, and second stop 38 having a second top surface 44, and,
in (d), positioning side 506 of electronic device 500 on first 42 and second 44 top surfaces.

The method further including:
in (c), front support 24 having a first end and an opposite second end;
in (c), a first upwardly projecting ear 46 disposed at the first end, and a second upwardly projecting ear 48 disposed at the second end; and,
in (d), first 46 and second 48 upwardly projecting ears serving to hold electronic device 500 in holder 20.

The method further including:
in (a), electronic device 500 having a control 508;
in (c), a first front support 24A and a second front support 24B, first 24A and second 24B front supports residing in spaced apart side-by-side relationship separated by a front support gap 50, first gap 50 allowing user access to control 508; and,
after (d), using control 508.

The method further including:
in (c), a first stop 36 disposed between first front support 24A and first rear support 26A;
in (c), a second stop 38 disposed between second front support 24B and second rear support 26B; and,
in (d), inserting bottom part 504 of electronic device 500 between first stop 36 and second stop 38.

The method further including:
in (c), a first stop 36 disposed between first front support 24A and first rear support 26A;
in (c), a second stop 38 disposed between second front support 24B and second rear support 24B, first stop 36 spaced apart from second stop 38;
in (c), first stop 36 having a first top surface 42, and second stop 38 having a second top surface 44, and,
in (d), positioning side 506 of electronic device 500 on first 42 and second 44 top surfaces.

The method further including:
in (c), first front support 24A having a first upwardly projecting ear 46, and second front support 24B having a second upwardly projecting ear 48; and,
in (d), first 46 and second 48 upwardly projecting ears serving to hold electronic device 500 in holder 20.

The method further including:
in (c), first front support 24A flexibly connected to said second front support 24B;
in (c), first rear support 26A flexibly connected to second rear support 26B, and;

in (e), base 22 transversely conforming to support surface 600.

The embodiments of the holder and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the holder and method should be construed as limiting the invention to a particular embodiment or combination of embodiments. The scope of the invention is defined by the appended claims.

I claim:

1. A holder for an electronic device, the holder comprising:
   a flexible base that is configured to conform to a support surface about a central axis of the flexible base, the flexible base is a substantially horizontal base;
   a first front support and a second front support connected to and upwardly projecting from said flexible base, the first front support and the second front support being separated laterally by a front support opening;
   a first rear support and a second rear support connected to and upwardly projecting from said flexible base, the first rear support and the second rear support being separated laterally by a rear support opening, said first rear support and said second rear support are respectively spaced apart from said first front support and said second front by a cavity extending therebetween, said cavity is comprised by a first cavity portion and a second cavity portion, said first cavity portion being open at opposed ends of the first cavity portion and shaped and dimensioned to receive and hold the electronic device in a substantially stationary position in the holder;
   a first stop disposed below the first cavity portion and located between and spacing apart the first front support and the first rear support;
   a second stop disposed below the first cavity portion and located between and spacing apart the second front support and the second rear support;
   the first stop being spaced apart from the second stop to define a second cavity portion,
   the second cavity portion being bounded by the first stop, the second stop, the first front support, the second front support, the first rear support and the second rear support;
   a base portion of the second cavity portion is formed by a top surface portion of the flexible base bounded by said first rear support, said second rear support, said first front support, said second front, the first stop, and the second stop; the base portion being vertically disposed lower than a top surface of the first stop and a top surface of the second stop the front support opening and the rear support opening align with each other along the central axis;
   a flap member is formed by a portion of said flexible base flexibly connected to and extending away from a front of said first front support and said second front support to a free end of said flexible base, said flap member is substantially flat, and a top surface of said flap member is substantially planar, said front support opening provides a passage on the top surface portion of the flexible base from said top surface of said flap member into said second cavity portion; and
   wherein the first cavity portion is configured to receive the electronic device such that the electronic device is supported on a spaced-apart base formed by the top surface of the first stop and the top surface of the second stop in a first orientation, and wherein the first cavity portion and the space between the top surface of the first stop and the top surface of the second stop enables the electronic device to be received in the second cavity portion in a second orientation different from the first orientation.

2. The holder according to claim 1, wherein a height of the first front support is less than a height of the first rear support and a height of the second front support is less than a height of the second rear support.

3. The holder according to claim 1, further including:
   said first front support and second front support each having a rear surface, and said a first rear support and second rear support each having a front surface; and,
   said rear surfaces of said first front support and second front support and said front surfaces of said first rear support and second rear support being parallel to each other and forming supplementary angles with said base portion.

4. The holder according to claim 3, wherein an angle between the rear surface of the first front support and the base portion is 75°±10°.

5. The holder according to claim 3, wherein the top surface of the first stop and the top surface of the second stop is perpendicular relative to the rear surface of the first front support and second front support and the front surface of the first rear support and second rear support.

6. The holder of claim 3, wherein the second cavity portion is configured such that while the electronic device is received in the second cavity portion the electronic device is laterally retained by the first stop and the second stop and is gripped by the first front support and first rear support and the second front support and second rear support, wherein the supplementary angles between the rear surface of the first front support and the second front support and the base portion and the front surface of the first rear support and the second rear support and with the base portion is configured to force a tight grip on the electronic device by virtue of a weight of the electronic device.

7. The holder according to claim 1, wherein said flexible base, said first front support, said second front support, said first rear support and said second rear support are made from silicone or rubber or synthetic polymer.

8. The holder according to claim 1, wherein:
   said first front support has a first end and an opposite second end;
   a first upwardly projecting ear is disposed at said first end of the first front support, and said second end forming a first side of the first support opening between the first front support and the second front support;
   said second front support has a first end and an opposite second end; and
   a first upwardly projecting ear is disposed at said first end of the second front support, said second end forming a second side of the first support opening between the first front support and the second front support.

9. The holder according to claim 1, wherein said base portion flexibly connects said first front support to said second front support about the central axis; and, said base portion flexibly connects said first rear support to said second rear support about the central axis so that said base portion can transversely conform to the support surface about the central axis.

10. The holder of claim 1, wherein the support surface which the flexible base is configured to conform to about the central axis is a dashboard of a motor vehicle.

11. The holder of claim 1, wherein an upper portion of the front support opening is wider than the lower portion of the front support opening, and an upper portion of the rear support opening is wider than the lower portion of the rear support opening.

12. The holder of claim 11, wherein a shape of the upper portion of the front support opening is semi-circular.

13. The holder of claim 11, wherein the upper portion of the front support opening is wider than the upper portion of the rear support opening.

14. The holder of claim 1, wherein a height and a width of the first front support is less than a height and a width of the first rear support.

* * * * *